Sept. 17, 1946.  C. W. SINCLAIR  2,407,749
VEHICLE WHEEL
Filed Oct. 23, 1944  2 Sheets-Sheet 1
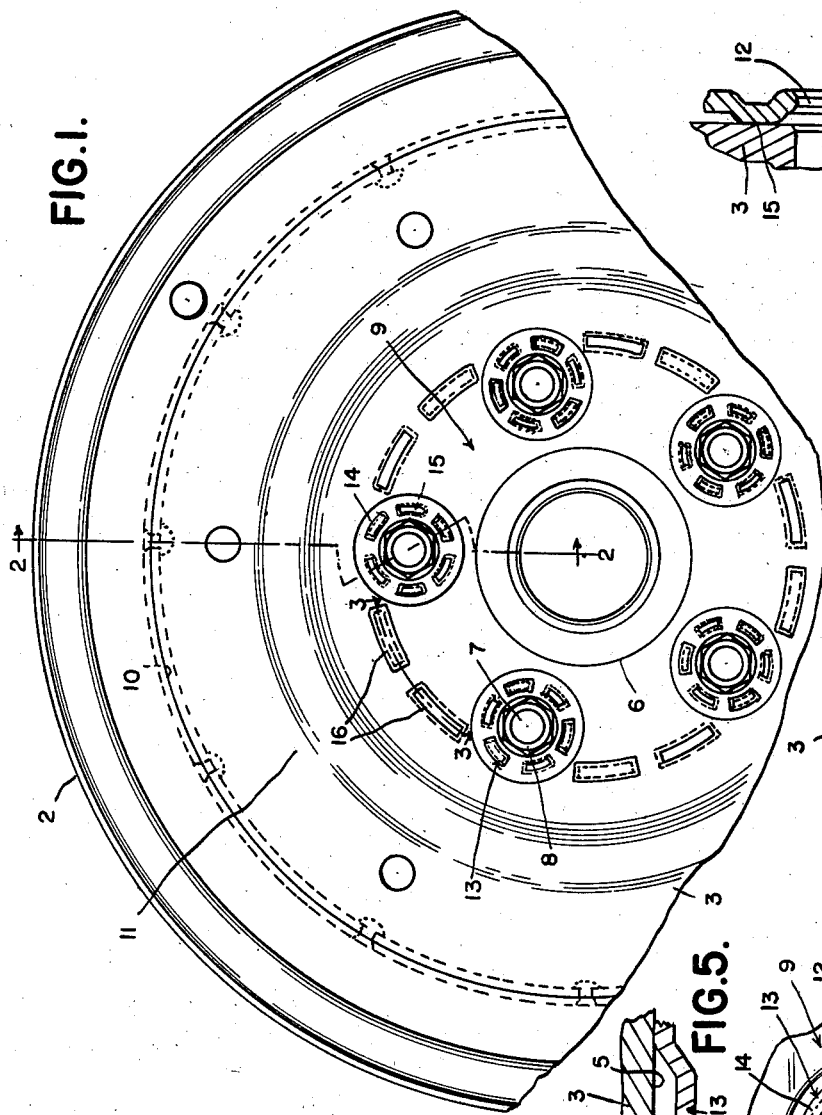
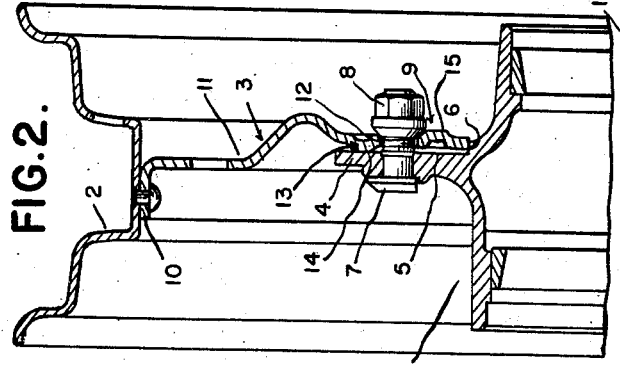
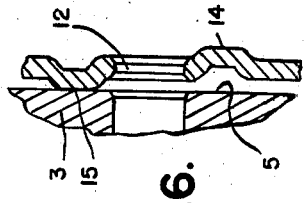
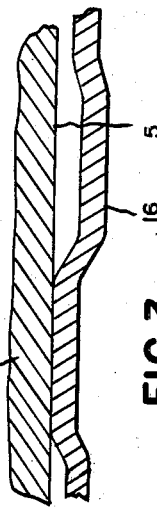
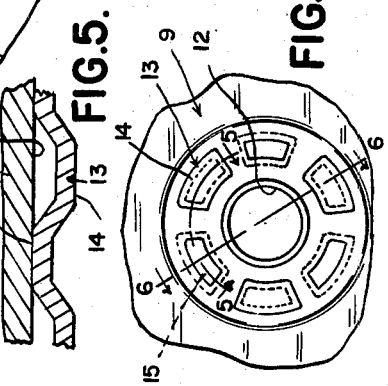
INVENTOR.
CHARLES W. SINCLAIR
BY
ATTORNEYS Sept. 17, 1946.  C. W. SINCLAIR  2,407,749
VEHICLE WHEEL
Filed Oct. 23, 1944  2 Sheets-Sheet 2
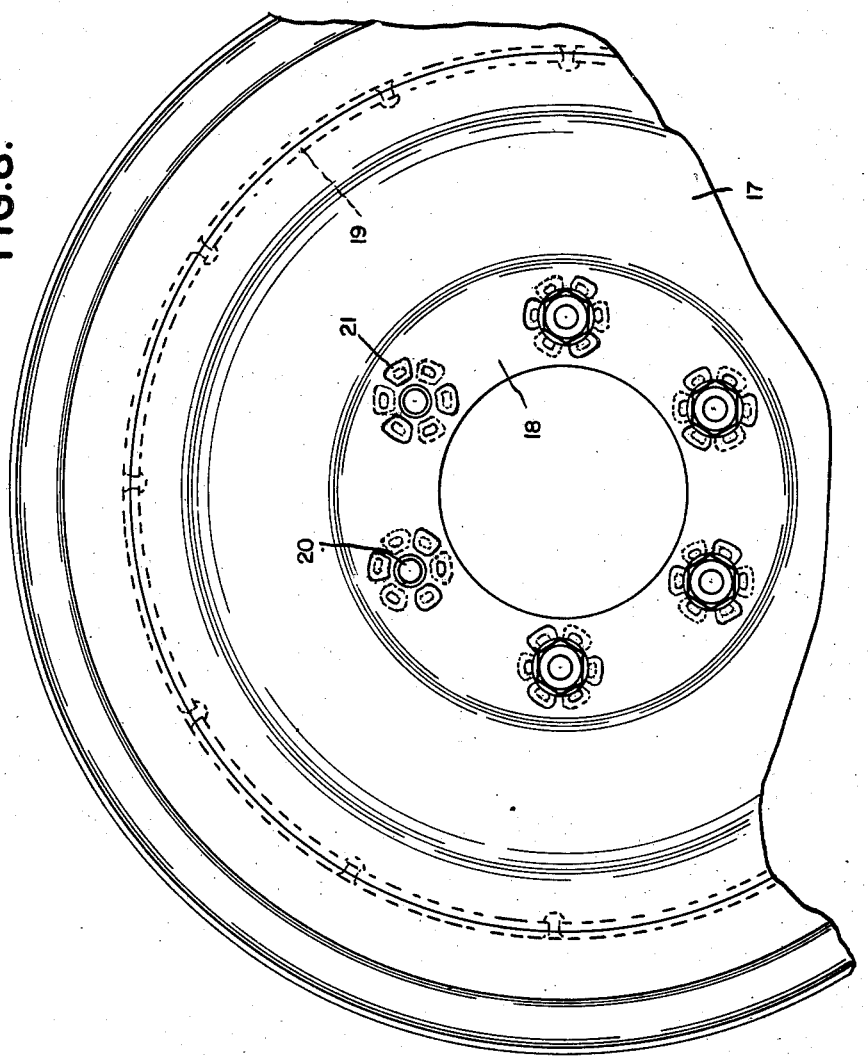
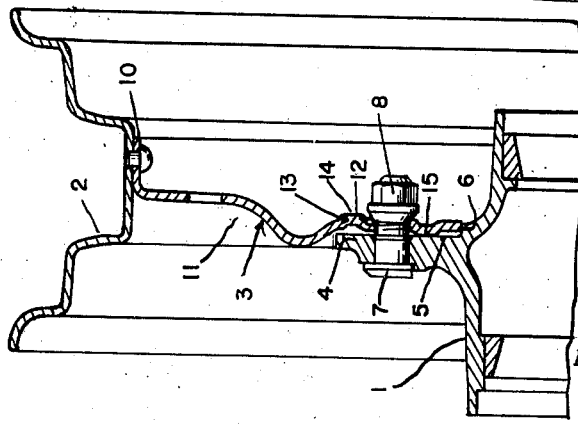
INVENTOR.
CHARLES W. SINCLAIR
BY
ATTORNEYS Patented Sept. 17, 1946

2,407,749

UNITED STATES PATENT OFFICE 2,407,749

VEHICLE WHEEL

Charles W. Sinclair, Detroit, Mich., assignor to Kelsey-Hayes Wheel Company, Detroit, Mich., a corporation of Delaware Application October 23, 1944, Serial No. 559,932

5 Claims. (Cl. 301—9)

1

The invention relates to vehicle wheels and refers more particularly to vehicle wheels of the reversible type.

The invention has for one of its objects to provide an improved construction of wheel having a sheet metal wheel body constructed to be mounted on a hub with either face adjacent the hub.

The invention has for another object to construct the wheel body so that it may flex substantially equally in each of its reversible positions.

With these and other objects in view, the invention resides in the novel features of construction and combinations and arrangements of parts as more fully hereinafter set forth.

In the drawings:

Figure 1 is an elevation of a portion of a vehicle wheel embodying the invention;

Figures 2 and 3 are cross sections on the lines 2—2 and 3—3, respectively, of Figure 1;

Figure 4 is an enlarged view of a portion of Figure 1;

Figures 5 and 6 are cross sections on the lines 5—5 and 6—6, respectively, of Figure 4;

Figure 7 is a view similar to Figure 2 with the wheel reversed;

Figure 8 is a view similar to Figure 1 showing a modified construction.

In general the wheel is a reversible wheel adapted particularly for use in farm machinery.

As illustrated in Figures 1 to 7, inclusive, the wheel comprises the hub 1, the tire carrying rim 2 and the wheel body 3 mounted on the hub and carrying the rim. The hub is provided with the fixed radial flange 4 having the planar annular face 5 and the pilot portion 6. The hub has fixedly secured to its radial flange the annular series of axial bolts 7 which are angularly spaced equal distances from each other and the outboard ends of which are adapted to be threadedly engaged by the nuts 8. The bolts 7 and 8 form the means for securing the wheel body to the hub. The rim member 2, as shown, is of the drop-center type.

The wheel body 3 is formed of pressed sheet metal and has the radially inner mounting portion 9, the radially outer peripheral portion 10 and the intermediate portion 11, the peripheral portion 10 being axially offset from the mounting portion 9 and having the rim 2 fixedly secured thereto, the arrangement being such that by reversal of the wheel body the peripheral portion and, as a result, the rim may be placed in either of two axial positions relative to the hub.

2

The mounting portion is provided with the annular series of holes 12 which are positioned to register with and receive the securing bolts 7. The mounting portion is also provided with the annular series of projections 13 surrounding and spaced from each of the holes 12 and extending alternately in opposite axial directions and forming bearings at their outer ends for engagement with the planar face 5 of the hub. The holes are in the same planar zone and the projections are in the nature of bosses depressed from the mounting portion with the bosses at each side of the mounting portion having their abutment faces 14 and 15 in the same planar zones spaced axially from the planar zone of the holes. As a result, the part of the mounting portion between the projections or bosses flex with either side of the mounting portion adjacent to or facing the hub when the mounting portion is secured in place by the bolts 7 and the nuts 8.

To provide for a more substantial mounting of the wheel body on the hub, the mounting portion 9 is provided between the adjacent annular series of projections 13 with the pair of arcuately arranged projections 16. These projections are bosses depressed to extend axially in opposite directions and the pairs are similarly arranged with the projections on each side of the mounting portion having their abutment faces in the same planar zone. The arrangement of the annular series of projections and also the arcuate pairs of intermediate projections is such that the same amount of flexible material in the mounting portion is present when the wheel is mounted with either face adjacent to or against the fixed flange of the hub.

Figure 8 illustrates a modified construction of vehicle wheel which differs from that of Figures 1 to 7, inclusive, mainly in omitting the arcuate pairs of projections between the annular series of projections. More particularly, the wheel body 17 has the mounting portion 18 which is axially offset from the peripheral portion 19 to which the rim is secured. The mounting portion is provided with the annular series of bolt receiving holes 20 which are equally spaced from each other. The mounting portion is also provided with the annular series of projections 21 surrounding each hole with the alternate projections extending axially in opposite directions. The projections 21 are formed in the same manner as the projections 13. With this construction of wheel, it will be noted that the mounting portion may flex substantially equally in each of its reversible positions inasmuch as the same amount or extent of flexible material is present.

What I claim as my invention is:

1. A reversible wheel comprising a wheel body having a mounting portion provided with an annular series of holes and projections substantially surrounding and spaced from and substantially concentric with each of said holes and extending alternately in opposite generally axial directions and forming bearings for engagement with a wheel hub.

2. A reversible wheel comprising a wheel body having a mounting portion provided with an annular series of holes and an annular series of projecting bosses surrounding and spaced from and substantially concentric with each of said holes and extending alternately in opposite generally axial directions and forming bearings for engagement with a wheel hub.

3. A reversible wheel comprising a sheet metal wheel body having a radially inner mounting portion and an axially offset radially outer peripheral portion, said mounting portion being provided with an annular series of holes in the same planar zone for receiving means for securing said wheel body to a hub, said mounting portion also being provided with an annular series of projecting bosses surrounding and substantially concentric with each of said holes and extending alternately in opposite generally axial directions and forming bearings in the same planar zone for engagement with a planar face of the hub, said bosses being spaced from the adjacent opening and the part of said mounting portion between said bosses being flexible with either side of said mounting portion facing the hub.

4. A reversible wheel comprising a wheel body having a mounting portion provided with an annular series of holes, an annular series of projections surrounding and spaced from and substantially concentric with each of said holes and extending alternately in opposite generally axial directions, and a plurality of projections between adjacent annular series of projections extending generally axially, said annular series of projections and plurality of projections forming bearings for engagement with a wheel hub.

5. A reversible wheel comprising a sheet metal wheel body having a mounting portion provided with an annular series of holes in the same planar zone, an annular series of bosses surrounding and spaced from and substantially concentric with each of said holes and extending alternately in opposite generally axial directions, and a pair of bosses between adjacent annular series of bosses extending in opposite generally axial directions, said annular series of bosses and pairs of bosses forming bearings in the same planar zone for engagement with a wheel hub.

CHARLES W. SINCLAIR.